May 19, 1953 — J. J. CRESKOFF — 2,638,655
METHOD OF PRODUCING CEMENTITIOUS BODIES
Filed Sept. 22, 1950
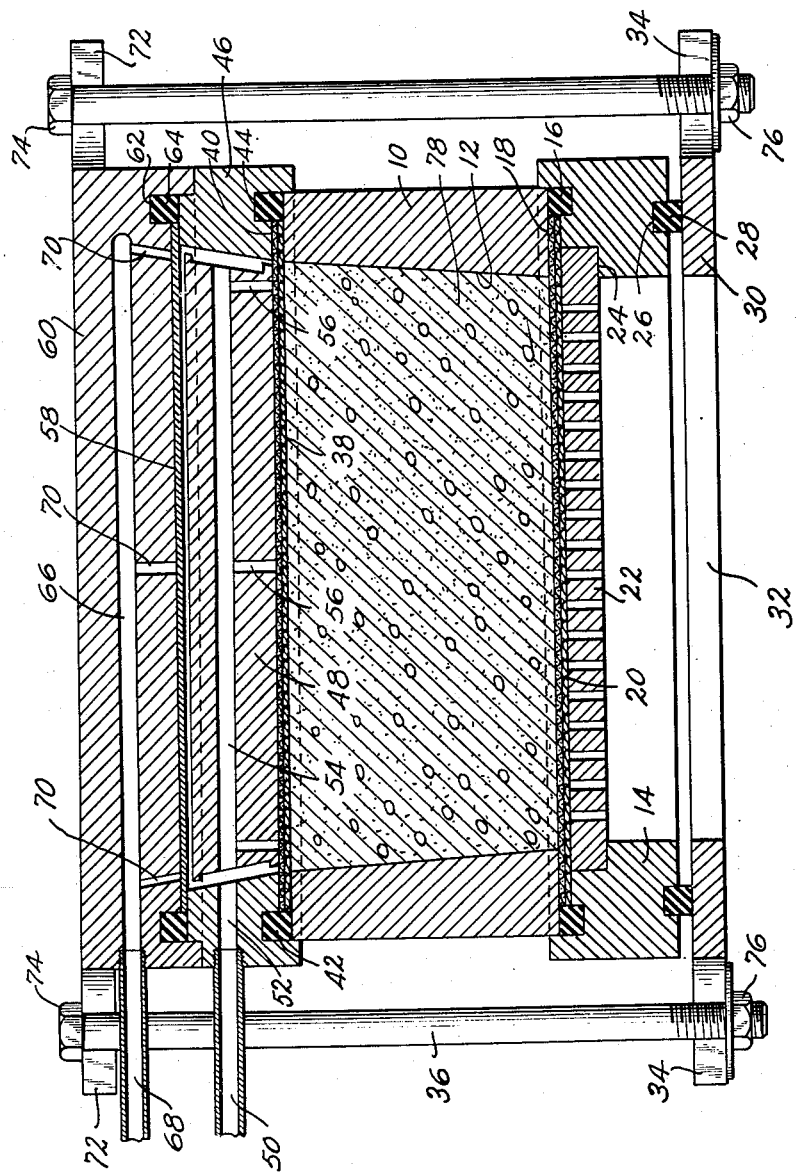
INVENTOR
JACOB J. CRESKOFF.
BY Raymond W Bolton Patented May 19, 1953

2,638,655

UNITED STATES PATENT OFFICE 2,638,655

METHOD OF PRODUCING CEMENTITIOUS BODIES

Jacob J. Creskoff, Washington, D. C., assignor to Thermo-Fluid Corporation, a corporation of Pennsylvania Application September 22, 1950, Serial No. 186,255

14 Claims. (Cl. 25—155)

This invention relates to the rapid production of cementitious bodies having low water:cement ratios.

From the standpoints of strength, durability, impermeability, density, abrasion resistance and volume uniformity, it is well known that low water:cement ratios of Portland cement compositions are desirable. Although this fact has been recognized since Abrams first postulated the water:cement ratio law for plastic masses, prior to the present time no commercially feasible method has been developed for the production of Portland cement compositions having water:cement ratios less than 0.4 by weight.

The progressive addition of cement to a constant quantity of water has proved to be highly uneconomical and has produced unacceptable changes in volume without achieving the results sought; the addition of only the small amounts of water required for the low ratios sought has invariably produced compositions which are unworkable and which would neither flow nor produce satisfactory surfaces; and removal of water from a flowable mixture in the mold has never resulted in a composition having such a low ratio since such attempts have always been subject to the restrictions imposed by the relatively low pressure differentials employed, and limited by a relatively non-uniform and relatively low degree of penetration.

In accordance with this invention the long sought objectives of the prior art have been achieved. The present method of producing a cementitious body having a low water:cement ratio, preferably less than 0.6 by weight, comprises depositing a composition containing aggregate and Portland cement in a mold, subjecting the composition to a differential pressure exceeding one atmosphere, passing a stream of compressible fluid substantially uniformly through the composition, and simultaneously modifying the water content of the composition before it acquires an initial set. In most instances water will be present with the aggregate and Portland cement deposited in the mold, and where such water is in excess of that required for the desired water:cement ratio, the water content will be reduced simultaneously with the passage of fluid under pressure and before the composition acquires an initial set. On the other hand, where there is insufficient water present in the composition to produce the desired ratio, the water content will be increased simultaneously with the passage of fluid under pressure and before the composition acquires an initial set.

It is contemplated for many applications of the present method that the compressible fluid to be passed through the composition have a superatmospheric temperature, which will in numerous cases exceed 125° F. The use of steam for this purpose is highly satisfactory where its characteristics are compatible with the results to be attained.

Adjustment of the water:cement to a value less than 0.6 by weight in accordance with the present invention, will in most cases involve the range of 0.04 to 0.40, and values below 0.4 and 0.2 respectively have produced particularly outstanding results for particular applications.

The time during which the stream of compressible fluid is passed through the composition will vary, but exceptionally gratifying results have been achieved where the time is less than one minute. Moreover, in many cases the preferred differential pressure will exceed two atmospheres. It is indicated from these results that the water:cement ratio is an inverse function of the differential pressure employed and the time a given fluid is passed through the composition.

The bulking property of dry aggregates, such as sand, has been employed to great advantage in practicing this invention, by relying on this property to produce pressure upon the confined mass of plastic when the moisture content is properly adjusted to a value based upon the weight of the sand of 2% to 12% in excess of the setting requirements of the cement.

Another remarkable result produced by this invention when superatmospheric temperatures are employed, has been the highly successful use of fly ash, usually considered to be a waste product, as a light weight aggregate.

A more complete understanding of the invention will follow from a description of the method with reference to apparatus which has been more or less schematically represented in the sectional elevation constituting the accompanying drawing.

A mold 10 having a downwardly convergent internal bore 12 has its lower end received in an annulus 14, counterbored to receive a resilient gasket 16 to maintain fluid tight relationship between the mold and annulus. Within the gasket 16, there is interposed between the abutting ends of the mold and annulus, a layer of woven fabric 18 superimposed upon a layer of metallic screen 20. These layers of relatively fine mesh materials are supported by a perforated plate 22 which is seated on a shoulder 24 provided by the annulus. The lower surface of the annulus contains a groove 26 for the reception of a resilient packing 28 which bears upon a plate or table 30 having a central opening 32 and containing slots 34 for the reception of bolts 36.

Seated on the upper end of the mold 10 there is another layer of woven fabric 38 upon which is superimposed a layer of woven screen 40, these layers of material lying within a resilient gasket 42 carried in a groove 44 in the lower end of an annulus 46. This annulus 46 serves as a cylinder for a floating piston 48, the cylinder having a peripheral opening to receive a fluid conducting pipe 50 threaded into the cylinder for communication with a radial bore 52 which communicates with one or more bores 54 radially arranged in the piston and communicating with a plurality of axial passages 56 for the distribution of fluid downwardly, as viewed in the drawing, through the woven layers into the mold 10. The upper end of the cylinder 48 is closed by a flexible diaphragm 58 whose periphery is engaged by the lower surface of a closure member 60 to clamp it in fluid tight relationship with the cylinder. The closure 60 contains a groove 62 which receives a resilient gasket 64 to maintain a seal between the closure and cylinder beyond the periphery of the diaphragm.

The closure 60 contains one or more radial passages 66 connected with a fluid supply line 68 and intersected by a plurality of axial passages 70. The closure is also provided with radial slots 72 for receiving the heads 74 of the bolts 36 so that the closure 60, cylinder 46, mold 10, annulus 14, and support 30 can be drawn together to maintain fluid tight relationship between them by the application of nuts 76 to the threaded ends of the bolts.

It will be noted that the lower end of the closure 60 has been made substantially identical with the lower end of the cylinder 46 so that in certain applications of the present invention, the closure 60 can be applied directly over the perforate layers 38 and 40 into sealing engagement with the upper end of the mold 10. Under these conditions, the diaphragm 58, piston 48 and cylinder 46 will not be used and shorter bolts 36 will be adequate.

At this point, it will be well to reemphasize the schematic nature of the apparatus depicted in the drawing, since it is quite evident that many different forms of apparatus can be employed in practicing the method herein contemplated.

The mold 10 has been shown as containing a cementitious body 78, depicted as concrete. By removal of the parts above the mold 10, a composition containing aggregate and Portland cement will be deposited in the mold, whereupon the parts will be restored to the positions shown in the drawing, the nuts 76 tightened on the bolts to produce a seal and fluid can be introduced through the tube 68 from which it enters the passage 66 and is distributed through the intersecting passages 70 to the upper surface of the flexible diaphragm 58 applying a force to the piston 48 which is transmitted through the woven layers 38 and 40 to compact the composition 78 in the mold 10. This force, in accordance with this invention will produce a pressure throughout the composition exceeding one atmosphere, and in many of the applications contemplated, will exceed two atmospheres. Whereas any fluid under pressure can be used to produce this effect, steam and compressed air suggest themselves as materials which are usually most readily available.

Simultaneously with the application of compacting pressure to the cementitious composition, a fluid will be introduced through the tube 50 and passage 52, into the radial passages 54 and their intersecting axial passages 56 over the entire surface of the relatively finely woven materials 38 and 40 which serve as distributors, so that this fluid will pass substantially uniformly through the composition, from which it will pass through the woven layers 18 and 20 and the perforated plate 22. Here again, the fluid may assume a variety of forms, but ordinarily, the function of this fluid will be to adjust the moisture content of the composition 78 and in many cases to change its temperature. Steam is eminently suited for the purpose, since it can be adjusted to any degree of saturation desired so as to add moisture or remove moisture. Moreover, steam temperatures are readily adjustable to produce the effects contemplated. However, air may be used for this purpose in some cases, since the moisture content of air can also be adjusted and so can its temperature.

To achieve the results herein contemplated, it is necessary that the modification of the water content of the composition occur before the composition acquires its initial set. Where water is present in the composition in excess of the amount desired, then of course, the fluid introduced through the tube 50 will serve to remove water. If on the other hand, a dry mix is first introduced into the mold, or a mix containing less moisture than desired in the finished product is present, the fluid introduced through the tube 50 will be so constituted that it will deposit water vapor through the composition in the mold. The fluid thus introduced through the composition will in most cases have a superatmospheric temperature exceeding 125° F. and steam suggests itself for such use.

The finished product contemplated by this invention will have a water:cement ratio less than 0.6 by weight, preferably within the range of 0.04 to 0.40. In this range, a value less than 0.40 produces excellent results and values less than 0.20 achieve results of an astounding nature. Under many sets of circumstances, the period of treatment with the fluid is less than one minute. The water:cement ratio can be varied to the desired value within very close limits by the adjustment of pressure and time of treatment, the ratio varying as an inverse function of such pressure and time.

When the closure 60 is applied directly over the woven layers 38 and 40 carried by the mold 10, the fluid introduced through the tube 68 will then be the fluid that modifies the water content of the composition 78, under these conditions, the diaphragm 58, piston 48 and cylinder 46 having been removed. Under these conditions, the superatmospheric pressure applied to compact the composition will be achieved by regulating the moisture content for the additional purpose of achieving the desired degree of bulking of the aggregate. This effect of bulking is described in detail in a publication of the Portland Cement Association, No. ST 20, second edition, entitled "Bulking of Sand Due to Moisture." This publication is dated January 1944 and shows the moisture effects on the bulking of sand to be rather pronounced and critical, particularly where the water available for bulking, based upon the weight of the sand, falls within the range of 2% to 12%.

is a residue from the burning of powdered coal and is itself a somewhat powdery substance made up of fused particles about one-half the size of the usual Portland cement particles. Whereas there have been efforts in the past to use fly ash in cementitious compositions, sometimes to replace a portion of the Portland cement itself, it is usually not sufficiently fine and its carbon content is ordinarily undesirable. Moreover, the early strength of concrete containing fly ash is inadequate for most purposes. When used in accordance with the method of the present invention however, fly ash which was definitely unacceptable in accordance with past experience, was apparently activated in some way, since it definitely contributed its increment of strength through the early ages of the concrete containing it.

The behavior of fly ash in the production of compositions following the present invention has indicated the desirability of its use not only as a partial substitute for the Portland cement, but also as a substitute for sand on an important scale. This increased use of fly ash has been shown to be particularly important in the production of extremely plastic wet mixes and concrete produced with this material can be stripped from its mold much more readily than similar compositions containing no fly ash.

In connection with improved stripping characteristics, it has been noted that the use of temperatures between 125° F. and 175° F. have been preferable. In the following examples, the parts given are by weight and the pressures are in terms of atmospheres absolute. External pressures refer to pressures other than those induced by the passage of steam or other compressible fluid through the composition or by the bulking of the aggregates. The steam pressure values are those measured at the inlet to the mold. In connection with each of the examples, the ingredients were mixed by rolling the dry ingredients in a drum. Where wet mixes were introduced into the mold, the water was also mixed in the drum.

This invention makes possible for the first time, the use on a wide scale of fly ash which is ordinarily regarded as a waste product. Fly ash in any case, after deposition of the composition in the mold, the mold itself was vibrated to obtain a preliminary compaction.

gregate. It will also be noted that the time of contact of the steam with the composition was under one minute in each case, and in one case only five seconds. It is remarkable to note how quickly the specimens were removed from the mold, the average time not greatly exceeding one minute. Finally, the water:cement ratio achieved was as low as 0.04 by weight and extended through values to 0.48 by weight.

Inasmuch as the present invention has opened an entirely new and little explored field, substantially unlimited experimental work remains to be done. Under these circumstances, the relatively few examples disclosed herein should not be construed in a limiting sense beyond the scope of the appended claims.

I claim:

1. A method of producing a cementitious body having a low water:cement ratio comprising depositing a composition containing aggregate water, and Portland cement in a mold, subjecting said composition to a pressure exceeding one atmosphere, and before said composition acquires an initial set, modifying the water content of said composition to produce a water:cement ratio less than 0.6 by weight by passing a stream of compressible fluid having a temperature exceeding 125° F. into one portion of the mold, substantially uniformly through said composition, discharging said fluid from another portion of the mold, and separating said composition and mold after it has acquired an initial set.

2. A method as set forth in claim 1 wherein said mold portions are oppositely disposed.

3. A method as set forth in claim 1 wherein water is removed from said composition by said stream of compressible fluid.

4. A method as set forth in claim 1 wherein water is added to said composition by said stream of compressible fluid.

5. A method as set forth in claim 1 wherein the compressible fluid is steam.

6. A method as set forth in claim 1 wherein the water-cement ratio of said composition is adjusted to a value within the range of 0.04 to 0.50 by weight.

7. A method as set forth in claim 1 wherein the water:cement ratio of said composition is adjusted to a value less than 0.20 by weight.

8. A method as set forth in claim 1 wherein

*Examples*

| | | | | | | | | | | | | | | | |
|---|---|---|---|---|---|---|---|---|---|---|---|---|---|---|---|
| Cement | 100 | 100 | 50 | 100 | 100 | 100 | 100 | 100 | 100 | 50 | 50 | 50 | 25 | 25 | 25 | 43 |
| Fly ash | 0 | 100 | 150 | 100 | 100 | 100 | 100 | 100 | 100 | 150 | 150 | 150 | 175 | 175 | 175 | 257 |
| Sand | 600 | 500 | 500 | 500 | 500 | 500 | 500 | 500 | 500 | 500 | 500 | 500 | 500 | 500 | 500 | 0 |
| Gravel | 0 | 0 | 600 | 0 | 0 | 0 | 0 | 0 | 0 | 0 | 0 | 0 | 0 | 0 | 0 | 150 |
| Water | 0 | 0 | 0 | 130 | 120 | 150 | 150 | 140 | 140 | 140 | 140 | 140 | 140 | 140 | 140 | 150 |
| Slump (inches) | | | | 8 | 6 | 12 | 12 | 12 | 10 | 10 | 10 | 10 | 10 | 10 | 10 | 12 |
| External pressure | 10 | 10 | 0 | 0 | 0 | 0 | 0 | 0 | 0 | 0 | 0 | 0 | 0 | 0 | 0 | 0 |
| Steam pressure | 6 | 6 | 6 | 11 | 11 | 9 | 9 | 9 | 11 | 6 | 6 | 11 | 11 | 11 | 6 | 11 |
| Steam contact (seconds) | 45 | 45 | 45 | 20 | 10 | 45 | 45 | 45 | 15 | 15 | 30 | 30 | 15 | 15 | 5 | 30 |
| Mold vibration (seconds) | 30 | 30 | 30 | 20 | 10 | 30 | 30 | 30 | 15 | 15 | 30 | 30 | 15 | 15 | 5 | 30 |
| Strip time (minutes) | 15 | 5 | 1 | 1 | 1 | 1 | 2 | 3 | 1 | 1 | 1 | 1 | 1 | 1 | 1 | 5 |
| Speciment temp. ° F | 175 | 175 | 200 | 150 | 135 | 185 | 185 | 185 | 150 | 150 | 150 | 175 | 150 | 150 | 125 | 200 |
| Water:cement | .28 | .10 | .11 | .25 | .38 | .24 | .14 | .05 | .26 | .33 | .10 | .04 | .12 | .16 | .48 | .40 |

The estimated modulus of rupture at the stripping time of each of these specimens was in excess of 50 lbs. per sq. in. and the estimated compressive strength at an age of 28 days for each of the specimens was in excess of 5,000 lbs. per sq. in. provided of course, that the strength of the aggregate itself exceeds this value. It will be noted in connection with most of these examples that the superatmospheric pressure relied upon was attained by means of the steam pressure admitted into contact with the cementitious composition supplemented by the bulking effect of the agthe stream of compressible fluid is passed through said composition for a period of less than one minute.

9. A method as set forth in claim 1 wherein said pressure exceeds two atmospheres.

10. A method as set forth in claim 1 wherein said aggregate comprises fly ash.

11. A method of producing a cementitious body having a water:cement ratio less than 0.6 by weight comprising depositing a composition containing substantially dry sand and Portland cement in a mold, adding to said composition a quantity of water less than 60% based upon the weight of said cement, said quantity including 2% to 12% water, based upon the weight of said sand, in excess of the setting requirements of said cement, to produce a bulking effect in said composition, said water being added by passing a stream of compressible fluid at superatmospheric pressure containing water vapor above 125° F. into one portion of the mold, substantially uniformly through said composition, discharging the fluid from another portion of the mold, and separating said composition and mold after it has acquired an initial set.

12. A method of producing a cementitious body having a water:cement ratio less than 0.6 by weight comprising depositing a composition containing sand, water and Portland cement in a mold, and before said composition acquires an initial set adjusting the water content of said composition to a value less than 60% based upon the weight of said cement, said value including 2% to 12% water, based upon the weight of said sand, in excess of the setting requirements of said cement, to produce a bulking effect in said composition, said water being added by passing a stream of water-carrying fluid at superatmospheric pressure above 125° F. substantially uniformly through and beyond said composition, and separating said composition and mold after it has acquired an initial set.

13. A method of producing a cementitious body having a water:cement ratio less than 0.6 by weight comprising depositing a composition containing sand, Portland cement, and water in excess of 60% based upon the weight of said cement in a mold, and before said composition acquires an initial set, reducing the water content of said composition to a value less than 60% based upon the weight of said cement, said value including 2% to 12% water, based upon the weight of said sand, in excess of the setting requirements of said cement, to produce a bulking effect in said composition, said water content being reduced by passing a water absorbing stream of compressible fluid at superatmospheric pressure above 125° F. substantially uniformly through and beyond said composition, and separating said composition and mold after it has acquired an initial set.

14. A method of producing a cementitious body having a low water:cement ratio comprising depositing a composition containing sand and Portland cement in a mold, passing a stream of compressible fluid at superatmospheric pressure above 125° F. uniformly through and beyond said composition, said composition and fluid having a total water content exceeding 12% based upon the weight of said sand in excess of the setting requirements of said cement, and transferring water between said composition and fluid in sufficient quantity to retain in said composition after the passage of said fluid therethrough 2% to 12% water, based upon the weight of said sand, in excess of the setting requirements of said cement, and separating said composition and mold after it has acquired an initial set.

JACOB J. CRESKOFF.

References Cited in the file of this patent

UNITED STATES PATENTS

| Number | Name | Date |
| --- | --- | --- |
| 764,361 | Jaques | July 5, 1904 |
| 2,046,867 | Billner | July 7, 1936 |
| 2,250,107 | Nelles | July 22, 1941 |
| 2,528,643 | Dubbs | Nov. 7, 1950 |